(12) United States Patent
Klippsten et al.

(10) Patent No.: US 10,318,545 B1
(45) Date of Patent: Jun. 11, 2019

(54) DATASET VISUALIZATION SYSTEM AND METHOD

(71) Applicant: Zoic Labs, LLC, Culver City, CA (US)

(72) Inventors: Carey Saker Klippsten, Valley Village, CA (US); Michael Romey, Sherman Oaks, CA (US); Katlan Merrill, Orange, CA (US); Matthew Thunell, Redondo Beach, CA (US); Timothy McBride, Long Beach, CA (US)

(73) Assignee: Zoic Labs, LLC, Culver City, CA (US)

( * ) Notice: Subject to any disclaimer, the term of this patent is extended or adjusted under 35 U.S.C. 154(b) by 415 days.

(21) Appl. No.: 15/186,395

(22) Filed: Jun. 17, 2016

Related U.S. Application Data (60) Provisional application No. 62/181,191, filed on Jun. 17, 2015.

(51) Int. Cl.
*G06F 16/26* (2019.01)
*G06F 3/0484* (2013.01)

(52) U.S. Cl.
CPC .......... *G06F 16/26* (2019.01); *G06F 3/04842* (2013.01); *G06F 3/04847* (2013.01)

(58) Field of Classification Search
None
See application file for complete search history.

(56) References Cited

U.S. PATENT DOCUMENTS

| | | | | |
|---|---|---|---|---|
| 2007/0188494 | A1* | 8/2007 | Agutter | G06T 11/206 345/440 |
| 2011/0179066 | A1* | 7/2011 | Cardno | G06F 16/00 707/769 |
| 2012/0271748 | A1* | 10/2012 | DiSalvo | G06Q 40/04 705/37 |
| 2015/0077326 | A1* | 3/2015 | Kramer | G06F 3/0325 345/156 |
| 2015/0310643 | A1* | 10/2015 | Rzeszotarski | G06T 13/20 345/440 |
| 2015/0351655 | A1* | 12/2015 | Coleman | A61B 5/0482 600/301 |
| 2016/0216923 | A1* | 7/2016 | Willamowski | G06F 3/1219 |

* cited by examiner

*Primary Examiner* — Wilson Lee
(74) *Attorney, Agent, or Firm* — Lance M. Pritikin (57) ABSTRACT

Systems, methods and non-transitory media are provided to cause or facilitate the interactive visualization of large datasets. Elements of the visualizations are user-engageable to allow the user to visualize various aspects of the dataset in selectable layers of detail, and view the relationships between the data stored and sorted within various selected data fields. Engagement with dataset visualization views by the user can trigger alternate dataset visualization views in secondary and tertiary visualization interfaces.

16 Claims, 9 Drawing Sheets

FIG. 2A — GROUPING (116)

| Vendor | |
|---|---|
| Vendor 4 | 7850623 |
| Vendor 5 | 550623 |
| Vendor 6 | 26623 |
| Vendor 7 | 1623 |
| | 423 |
| | 323 |
| | 323 |

132

Country
State
City
Zip

FIG. 2B — FILTERING (118)

| Date Ranges | |
|---|---|
| 2012-09-15 - 2013-06-14 | |
| 2011-10-11 - 2012-07-10 | |
| 2010-09-29 - 2011-06-28 | |

| Geospatial Boundary | |
|---|---|
| (64.43, -122.18) - (54.86, 99.77) | |

| Geospatial Radius | |
|---|---|
| 743.51 mi from (42.18, -75.05) | |
| 751.44 mi from (393.64, -119.05) | |

FIG. 2C — OPTIONS (122)

| Coordinate Field | |
|---|---|
| Vendor Location | |

| Datetime Field | |
|---|---|
| Contract Date | |

| Grouping Limit and Paging | |
|---|---|
| Low(61) | |

| Weight Fiels | |
|---|---|
| Contractual Obligation | |

FIG. 2D — GROUPING (116)

Field 1
Field 2
Field 3
Field 4
Field 5
Field 6
Field 7
Field 8
Field 9
Field 10
Field 11
Field 12

FIG. 2E — Custom User Preset (120)

Load | Save
Visualize

| Vendor | Country | State | Contract | Contractual Obligation | Contract Award Date |
|---|---|---|---|---|---|
| Vendor 1 | Country A | State A1 | V1K1 | $10,000,000 | August 11, 2013 |
| Vendor 1 | Country B | State B1 | V1K2 | $3,500,000 | January 5, 2011 |
| Vendor 1 | Country B | State B2 | V1K3 | $4,750,000 | October 2, 2014 |
| Vendor 1 | Country D | State D1 | V1K4 | $25,000,000 | December 14, 2012 |
| Vendor 2 | Country C | State C1 | V2K1 | $2,000,000 | September 4, 2015 |
| Vendor 2 | Country C | State C2 | V2K2 | $500,000 | November 4, 2015 |
| Vendor 2 | Country D | State D1 | V2K3 | $500,000 | July 7, 2015 |
| Vendor 2 | Country E | State E1 | V2K4 | $750,000 | February 2, 2016 |
| Vendor 2 | Country E | State E1 | V2K5 | $500,000 | April 12, 2015 |
| Vendor 2 | Country E | State E2 | V2K6 | $250,000 | October 6, 2014 |
| Vendor 2 | Country F | State F1 | V2K7 | $1,000,000 | May 24, 2013 |
| Vendor 2 | Country G | State G1 | V2K8 | $250,000 | May 29, 2014 |
| Vendor 2 | Country H | State H1 | V2K9 | $1,500,000 | July 18, 2015 |

DATASET VISUALIZATION SYSTEM AND METHOD

RELATED APPLICATIONS

This application claims the benefit of U.S. Provisional Application No. 62/818,191 filed Jun. 17, 2015, the content of which is incorporated by this reference in its entirety for all purposes as if fully set forth herein.

TECHNICAL FIELD

The present invention relates generally to the field of data visualization. More particularly, the invention concerns systems, methods and software programs to aid users in rapidly and efficiently visualizing large sets of raw data.

BACKGROUND

Large sets of interrelating data can be challenging for people to visualize. Prior expedients in this field are lacking in features that allow a viewer to easily adapt and interact with the data visualization, so as to view use-selected relationships between data fields and subsets of data elements. Moreover, conventional data visualization systems and methods tend to be deficient in interactive visualization features that allow the user to easily set custom data filtration parameters.

SUMMARY

Certain deficiencies of the prior art may be overcome by the provision of one or more embodiments of a dataset visualization system, method and program code in accordance with the present invention.

Certain exemplary embodiments of the present invention may comprise one or more software programs configured to enable large datasets to be rapidly visualized within a real-time graphics engine environment via a Web Browser-based environment or optionally deployed as a manually installed desktop application on an operating system. In preferred embodiments, queries to the source data sets can be, for example, selected, sorted, grouped, negated, filtered in rapid fashion and Visualized in a real-time.

Visualizations can be engaged and acted upon to dive into subsequent layers of sorted and grouped data sets. Engaged and acted upon data sets can trigger alternate visualization views of the primary datasets in secondary and tertiary visualization interfaces and again acted upon or engaged to trigger more filtered datasets. Additionally, the visualization interfaces may be configured to act as an interface to update authoritative datasets based on read/write access to these datasets. Alternatively, systems in accordance with the present invention may be designed to snapshot and track changes to these authoritative datasets to spot discrepancies over time. Thus a user can peel the visualized datasets like layers of an onion and view who changed these datasets, and how, from within the system.

In particular preferred embodiments, the user can visually and interactively (e.g., via mouse movement or click) select or draw geospatial, spatial boundaries or fences on these visualizations which can be used by the system and method to drive grouping and filtering processes in all interfaces, such as grouping, filtering and visualization interfaces. The user can drive into each visualization until they reach the actual database entry ID which can be linked back directly to the authoritative data source.

Further, in certain embodiments, secondary and tertiary visualizations can be by way of geospatial-based mapping applications such as Google Maps or Bing Maps, and various forms of 2D and 3D datasets such as spacecraft, aircraft, automobiles, ships, heavy earth moving equipment, or the like.

In particular preferred embodiments, users can save grouping, filtering and other preset filtering methods for later use or to share with other users within the same virtual environment. For example, user A can share presets with user B or with groups of users. User B can mutate or modify user A's shared preset and share the mutated preset with the user A or with the group.

In certain preferred embodiments of the system and method, datasets can be dynamically ingested, linked and imported into a clustering and aggregation engine. The engine may be data-agnostic and can be static or live and the raw data may come from a variety of applications and databases such as MySQL, S3, noSql, PostgreSql, Excel, Sql-lite. In addition, web-service-based API such as Facebook and twitter feeds by be used.

In particular preferred embodiments, resulting visualization queries, filtering and groupings of data can be exported in various formats such as PDF, Excel and other portable document file formats. Visualizations can also be exported into movie formats such as QuickTime or H264 file formats for presentations, and the like.

Users can either interface with traditional keyboard and mouse or with virtual reality based headgear systems and methods such as Oculus Rift or Microsoft Surface Devices or holo-rooms with gesture based control devices such as the Myo.

BRIEF DESCRIPTION OF THE DRAWINGS

Further advantages of the present invention may become apparent to those skilled in the art with the benefit of the following detailed description of the preferred embodiments and upon reference to the accompanying drawings in which.

DETAILED DESCRIPTION OF THE PREFERRED EMBODIMENTS

Referring now to the drawings, like reference numerals designate identical or corresponding features throughout the several views. Described herein are various preferred embodiments, of a system, method and software programs to facilitate user visualization of data in datasets.

Figure 1:
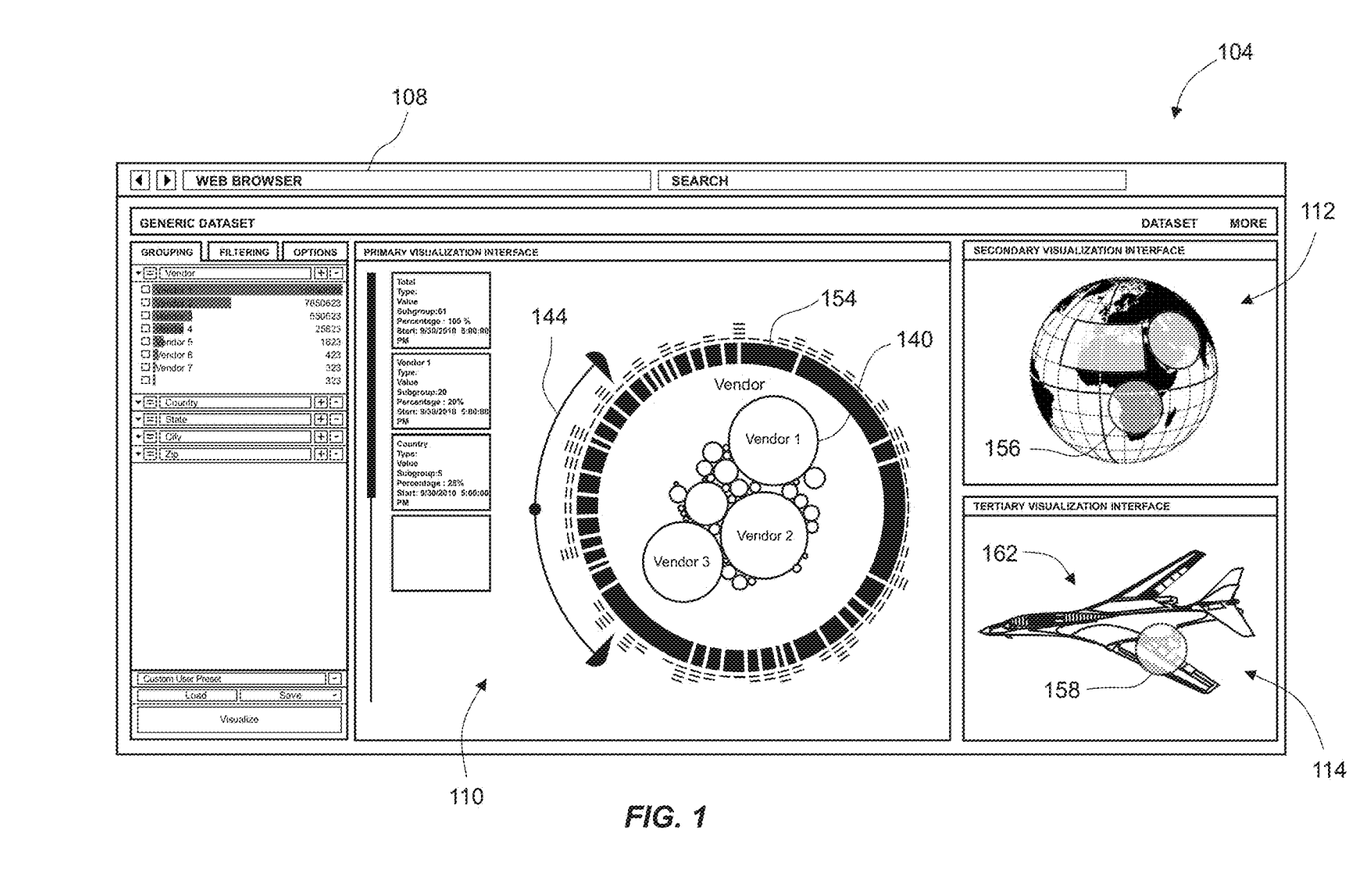
FIG. 1 is a diagrammatic view of one example embodiment of a web browser on a user computer display, illustrating various potential data selection and visualization interfaces in accordance with certain aspects of the invention.

FIG. 1 depicts one non-limiting example of a user computer display 104 associated with a user computing device. A user computing device may be, for example, a desktop computer 106a, a VR headset 106b, a laptop computer 106c, a tablet computer 106d, a smart phone or the like. The view in FIG. 1 illustrates how the various interfaces may be configured to relate to one another within the broader visualization. The application interfaces may be displayed, for example, within a web browser interface 108. The core user experience typically occurs by way of with the primary visualization interface 110. A grouping interface 116 and filtering interface 118 may be provided to drive what is then visualized in an optional secondary visualization interface 112 and tertiary visualization interface 114. Filter presets may be accessible by way of a visualization command interface 120. An options interface 122 may be provided to allow a user to, for example, apply weighting to particular data fields.

Figure 2:
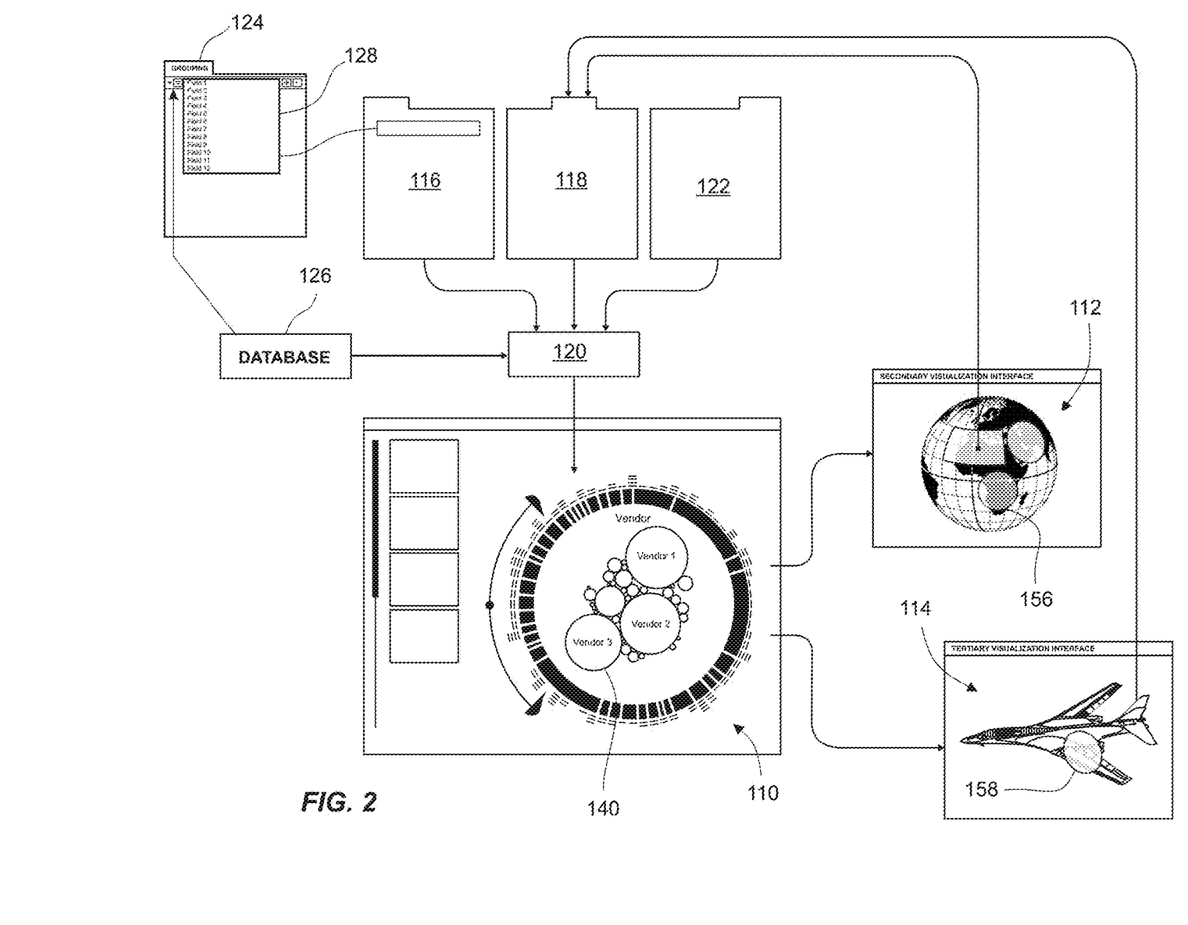
FIG. 2 is a diagrammatic view illustrating one example of the data flow interaction between grouping, filtering and options interfaces and visualization interfaces.
Figure 2A:
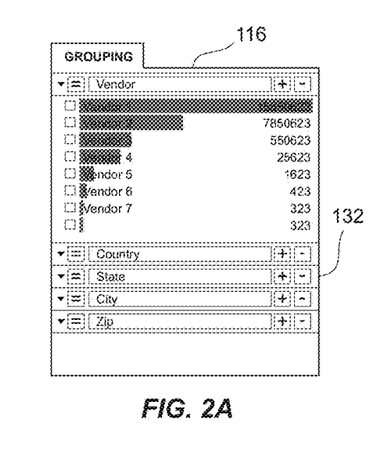
FIG. 2A is a diagrammatic view illustrating one example of a grouping interface.
Figure 2B:
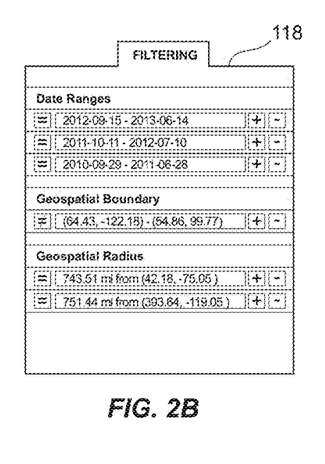
FIG. 2B is a diagrammatic view illustrating one example of a filtering interface.
Figure 2C:
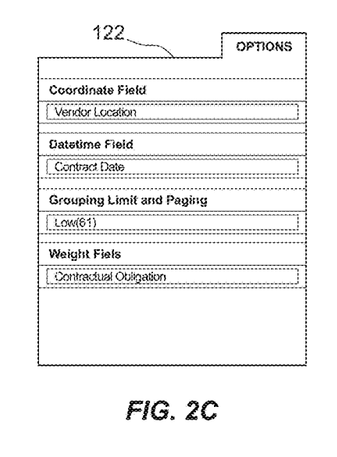
FIG. 2C is a diagrammatic view illustrating one example of an options interface.
Figure 2D:
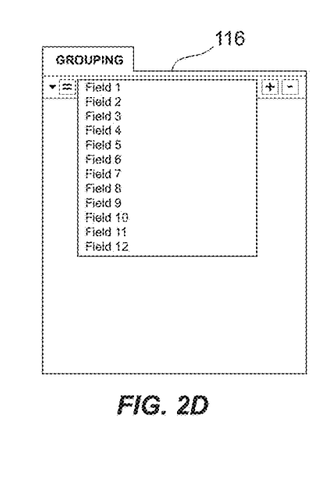
FIG. 2D is a diagrammatic view illustrating one example of a pulldown menu in a grouping interface, by which a user may select a data field of a dataset to define a grouping field.
Figure 2E:
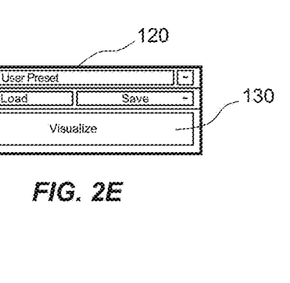
FIG. 2E is a diagrammatic view illustrating one example of a visualize command interface.

FIG. 2 shows one non-limiting example of how the grouping interface 116 and filtering interface 118 may drive the visualization interfaces. From the grouping tab 124, the database schema 126 may be queried and presented in, for example, a pull-down menu 128 from which the user can select various columnar data fields. With reference to FIG. 2A, the user can continue to layer these fields on top of one another. A vendor field may be, for example, hierarchically arranged above of a country field, state field, city field and zip code field. Each field typically represents a unique group or dataset which can then be sorted and filtered within each group of data selected. With reference to FIG. 2E, once the data fields and groups are selected, pressing a visualize button 130 may, for example, initiate a visualization query and compute engine, the results of which will then be displayed in the visualization interfaces. With reference to FIG. 2A, in certain preferred embodiments, the user can change the order of the field groupings by, for example, simply dragging them on top of each other. The user may also search within each selected field grouping for specific entries within that dataset. This may be referred to as a "needle in a haystack" search. The user may also elect to negate certain entries with in the field by, for example, selecting the entry 132 and inverting the selection. In preferred embodiments, the primary visualization interface 110 may be the key driver for visualizing the dataset selected from the grouping interface 116 and filtering interface 118. Engaging or acting upon data inside of this window will modify various other interfaces such as, for example, the secondary visualization interface 112 and tertiary visualization interface 114. The options interface 122 may be provided to allow the user to set certain options such as weighting the dataset by number of entries or currency as well as other various weights dependent upon the dataset being visualized.

Figure 3:
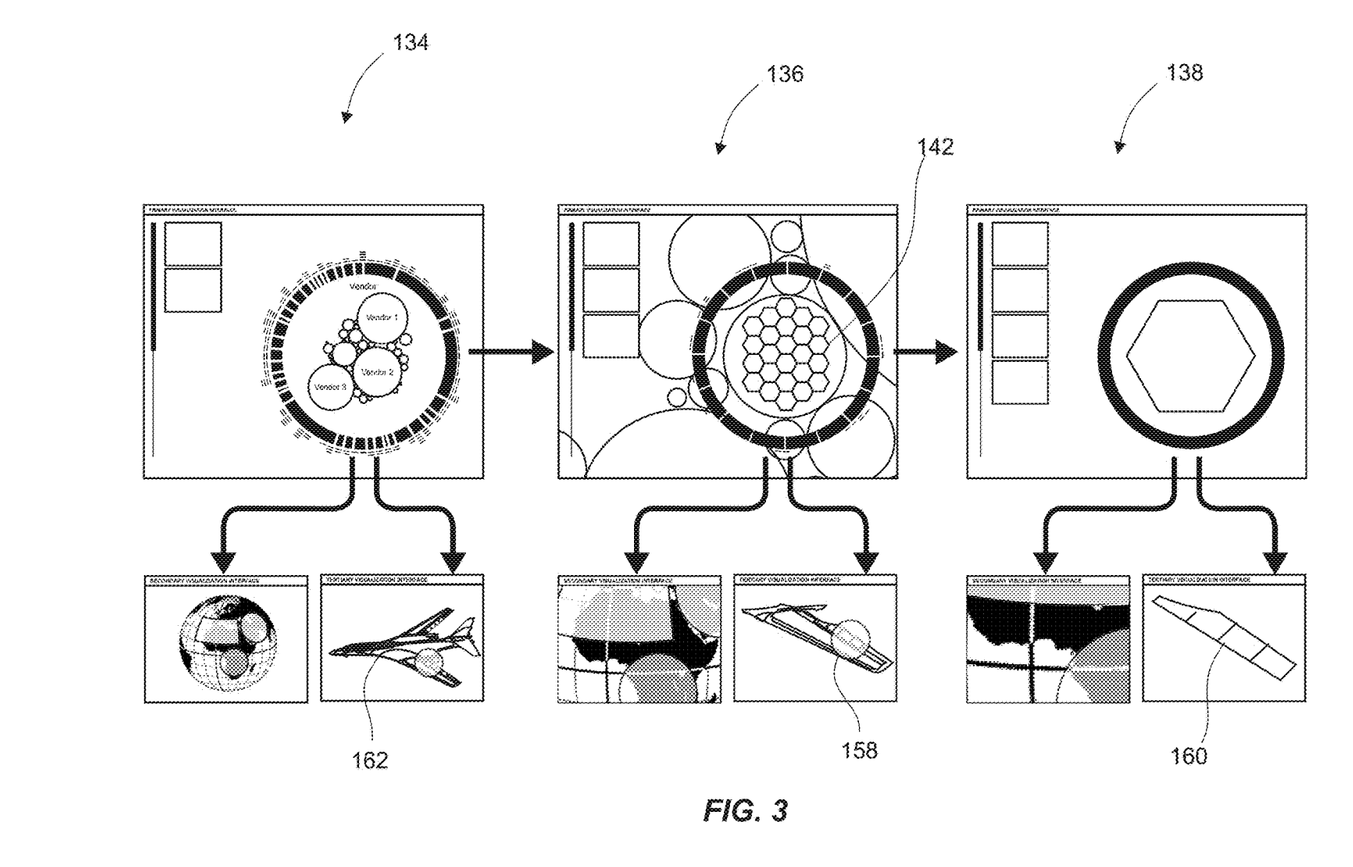
FIG. 3 is a diagrammatic view illustrating how the graphics in the visualization interfaces evolve based upon sequential user selection of particular spheres in the primary visualization interface, thereby allowing the user to interactively and visually drill down into relational data of particular interest.

FIG. 3 shows a non-limiting example of how the primary visualization interface may appear after a dataset 106 is selected from the database schema 126 by way of the grouping interface 116 and filtering interface 118 and the visualize button 130 is pressed. Illustrated in this figure are sequential revisions of the visualization interfaces based on the user's selected movement from a top-tier view of the dataset 134, to an intermediate-tier view of the dataset 136, to a lowest-tier view of the dataset 138. A sphere of influence model may be provided to calculate and display the dataset. Each sphere may represent its dataset based the size of the sphere. Each sphere 140 can be weighted based upon many different variables in a data field, such as number of entries or currency values such as dollars. When the user selects a sphere 140, the visualization engine may then be configured to delve into that selected dataset and display the next grouped value. Referring to FIG. 3 at the top-tier view 134, it is apparent that the vendor is on top, and then country. The sphere of influence corresponds to these groupings of data. The selected datasets may then drive the secondary and tertiary visualization interfaces. The hive view 142 within the primary visualization interface may be configured to be the lowest level of grouping the user can get to. This hive view 142 may represent, for example, the actual authoritative data layer which links back to the dataset entry point or the data that was used to create the actual dataset the user is visualizing. As is apparent, each level drives a more detailed or magnified view of the data section set or that the user is narrowing down on. This is not necessarily always the case, but represents one of the many ways a user (or groups of users) can visualize large datasets using the present teachings.

Figure 4:
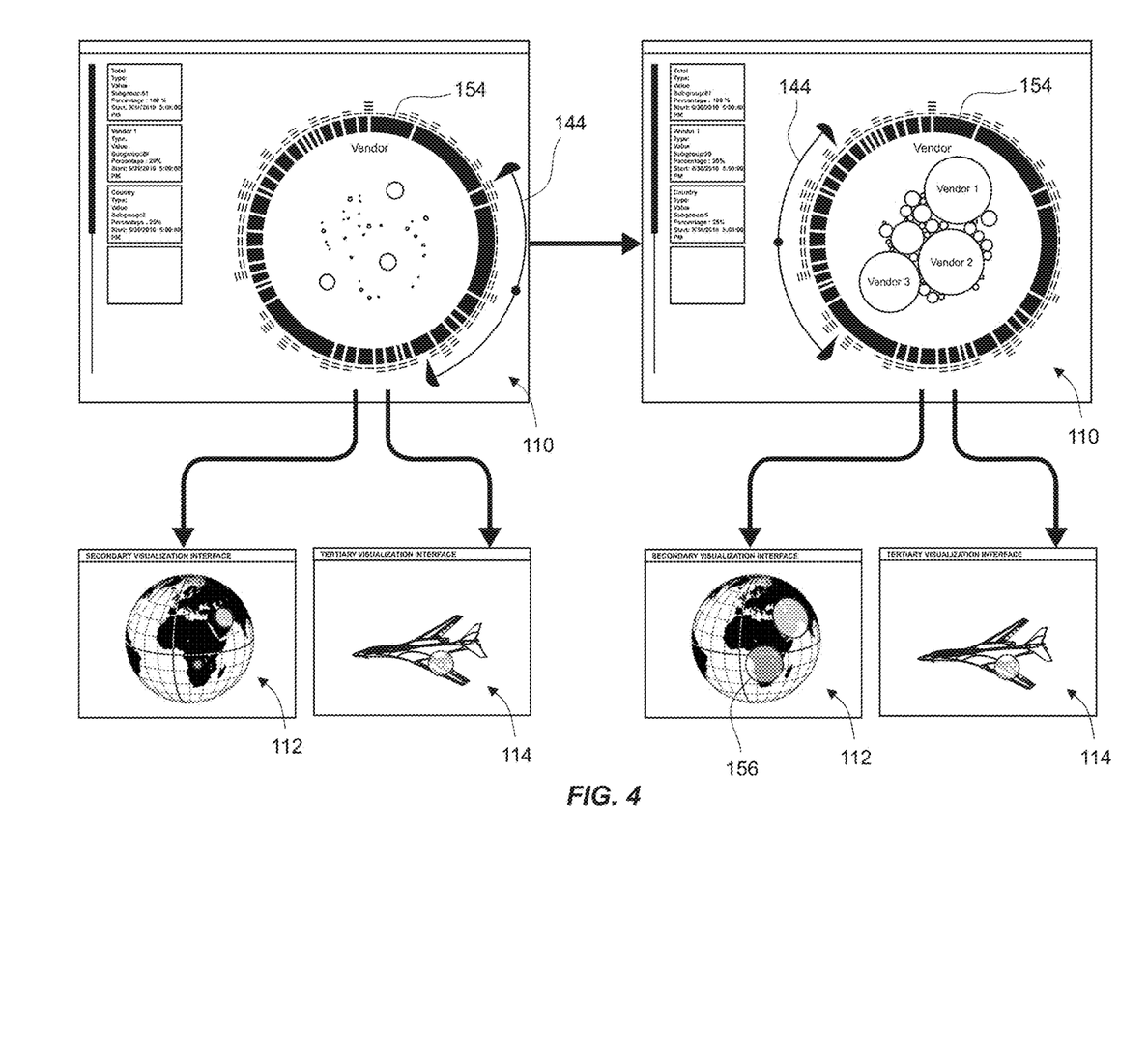
FIG. 4 is a diagrammatic view illustrating how the graphics in the visualization interfaces evolve based upon user movement of a time slider to select a new data time period, thereby allowing the user to interactively and visually limit the visualized data to the time period of particular interest.

Illustrated in FIG. 4 is one non-limiting example of a temporal (or time-based) visualization layered on top of a sphere of influence model. On the left side of the figure is a primary visualization interface 110 with a user-adjustable time slider 144 in a first position. On the right side of the figure is the primary visualization interface 110 in which the graphic representation of the dataset has changed responsive to a change in position of the time slider 144. The ability to visualize temporal on top of thematic datasets provides unique advantages to the user. For example, the user can play back time and see how the data grows over a period time. The user can also selectively isolate and filter out various datasets, and view how they grow over time in context of the filtered dataset.

Figure 5:
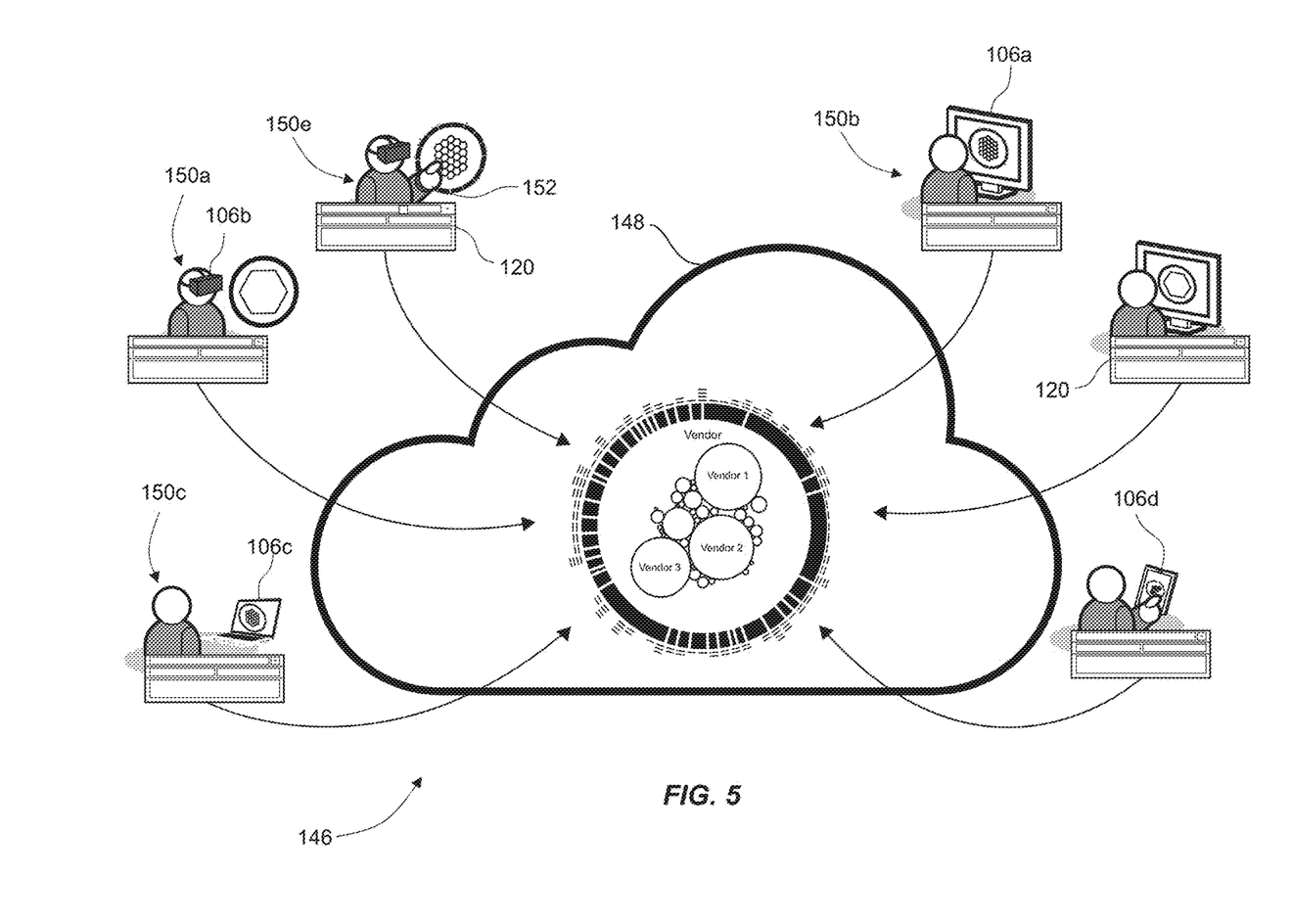
FIG. 5 is a diagrammatic system view illustrating an example of the potential interactive aspects of one example of a dataset visualization system.

FIG. 5 illustrates non-limiting examples of collaboration aspects of the presently-described system 146, method and software application. In certain embodiments, the application may be operated, at least in part, in a cloud 148 in a shared environment with a graphics visualization engine that resembles, for example, a multiplayer online game. With such implementations, users may have the ability to share and view visualizations in real-time across the world. This means that users can communicate through various methods and interact with shared datasets. For example, user A (shown at 150*a*) can share a preset or a visualization they have been working on with user B (shown at 150*b*) or user C (shown at 150*c*). User A is shown with a virtual reality headset 106*b* on. User B is shown at their desktop console 106*a*. User C with a portable device 106*c* such as a touch based tablet or laptop, user D with a tablet, and user E with a gesture control device 152 on their wrist or hand.

Figure 6:
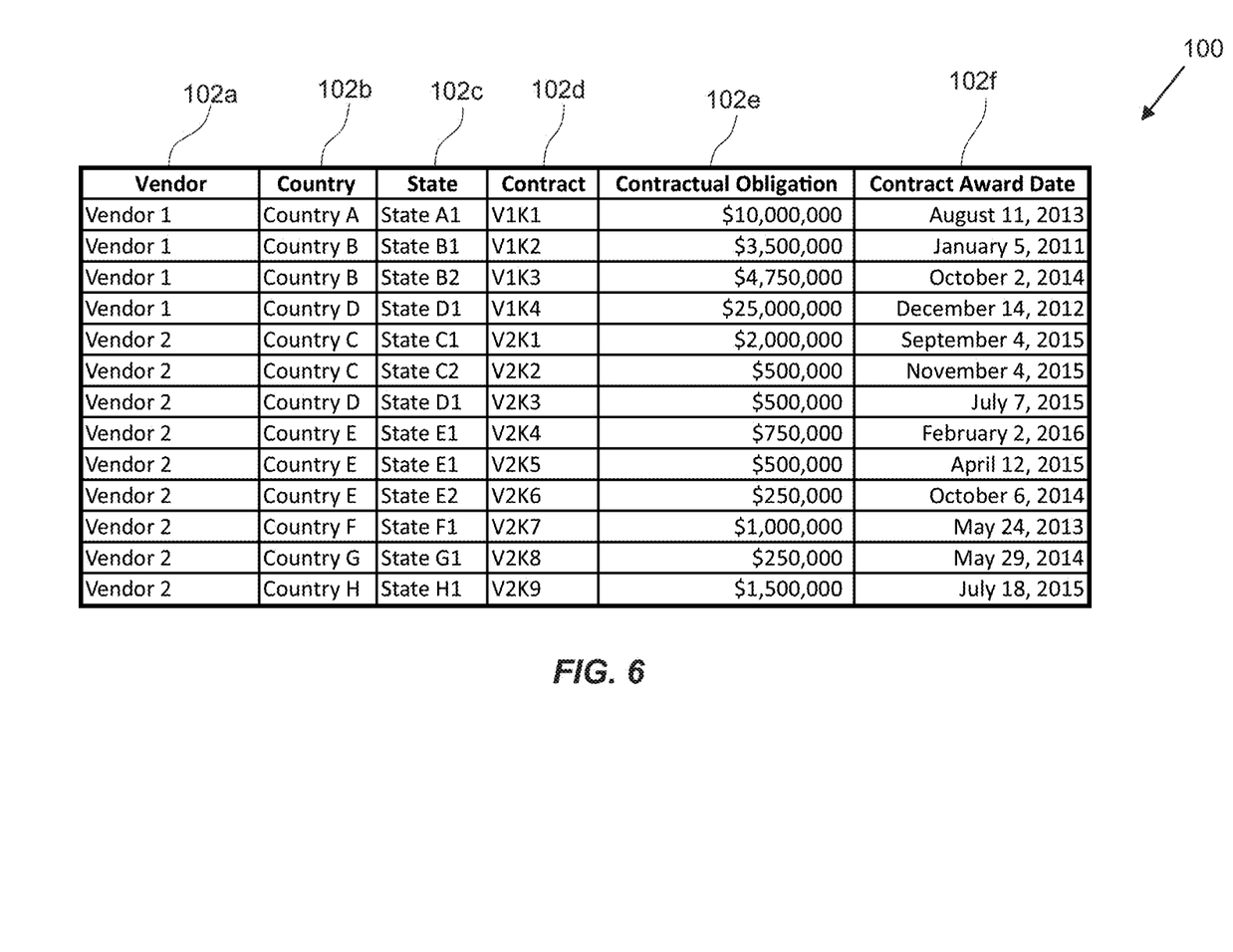
FIG. 6 is a diagrammatic example of a dataset including a plurality of data fields, wherein each data field has respective data entries therein, the data entries of one of the data fields has a date format, and data entries of at least one of the data fields are geolocations.
Figure 7A:
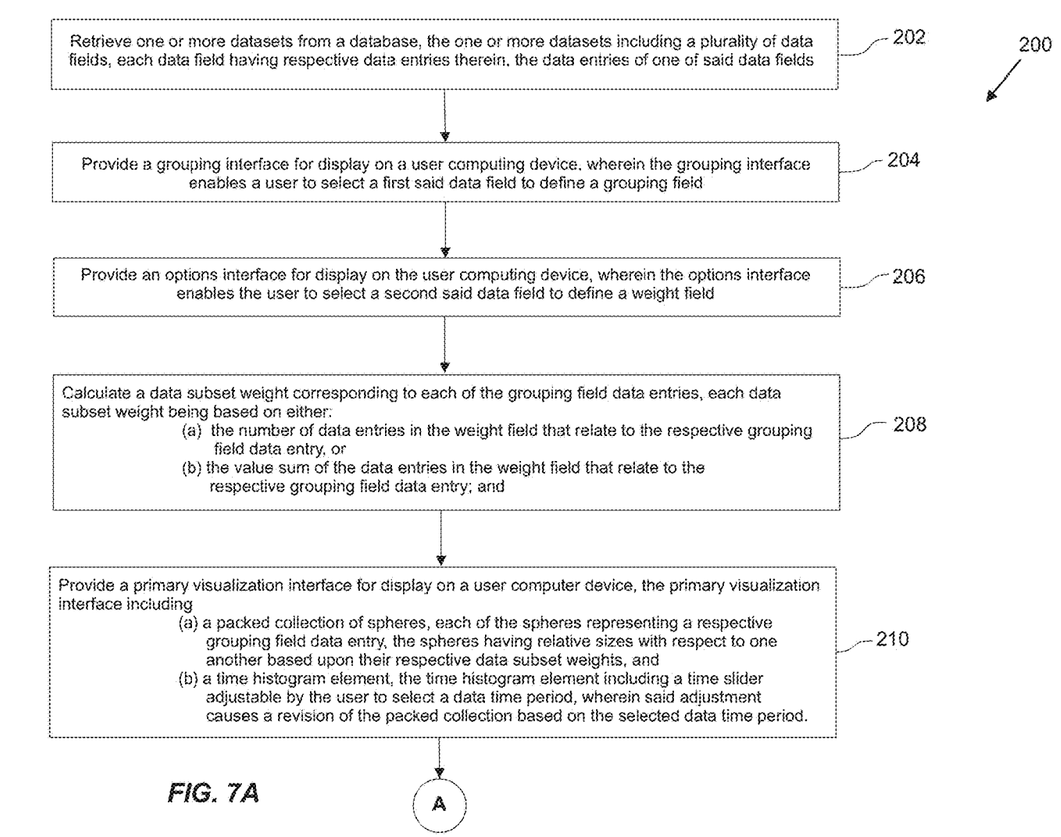
FIG. 7A is a diagrammatic block diagram illustrating one example of a method of visualizing one or more datasets.
Figure 7B:
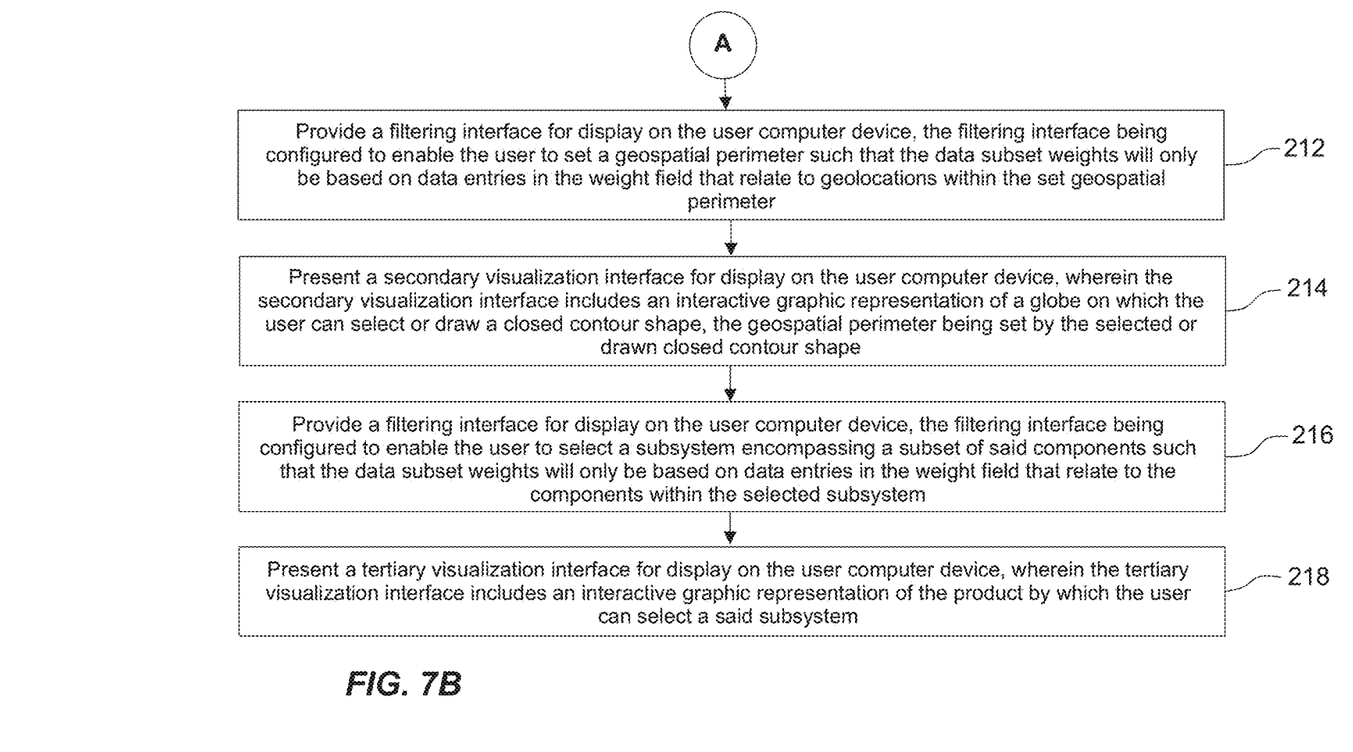
FIG. 7B is a diagrammatic block diagram illustrating example of additional optional steps of a method of visualizing one or more datasets.

Embodiments of a non-transitory computer readable medium may store computer-readable instructions for producing the visualization of data on a user computer display, wherein execution of the computer-readable instructions is configured to cause one or more computer processors to perform one or more steps. Embodiments of such steps are illustrated in FIGS. 7A and 7B. Referring to block 202, one or more datasets 100 may be retrieved from a database. The dataset 100 may include a plurality of data fields (e.g., 102*a*-102*f* in FIG. 6), each data field having respective data entries therein. The data entries of one of the data fields may have a date, time or date-time format (see, for example, field 102*f* in FIG. 6). Referring to block 204, the user may be enabled to select a first said data field to define a grouping field, for example, by way of a grouping interface 116 or the like. At block 206, the user may be enabled the user to select a second said data field to define a weight field, for example, by way of an options interface 122 or the like. Referring to block 208, a data subset weight corresponding to each of the grouping field data entries may be calculated. In particular preferred embodiments, each data subset weight may be based on either: (a) the number of data entries in the weight field that relate to the respective grouping field data entry, or (b) the value sum of the data entries in the weight field that relate to the respective grouping field data entry. Referring to block 210, a primary visualization interface may be presented on a user computer display 104. The primary visualization interface 110 may include a packed collection of spheres 140, each of the spheres representing a respective grouping field data entry. The spheres in a given collection have relative sizes with respect to one another based upon their respective data subset weights. The primary visualization interface 110 may also include a time histogram element 154 including a time slider 144 adjustable by the user to select a data time period. Such adjustment may preferably cause a revision of the packed collection based on the selected data time period. As illustrated, for example in FIG. 4, in certain embodiments of the non-transitory computer-readable medium, the time histogram element 154 may at least partially circumferentially envelope the packed collection of spheres.

In particular embodiments of the non-transitory computer-readable medium, the steps performed by the one or more processors may further comprise providing a grouping interface 116 configured to enable the user to select additional data fields to define respective additional grouping fields, wherein the grouping fields are organized hierarchically from highest to lowest. In addition, the user may be enabled to select a said sphere 140, thereby causing the collection of spheres to update such that the updated spheres represent data elements in the next lowest grouping field that relate to the data entry of the selected sphere.

In certain embodiments of the non-transitory computer-readable medium, the data entries of at least one of the data fields may be geolocations. See, for example, data fields 102*b* and 102*c* in FIG. 6. In such embodiment, the steps may further comprise providing a filtering interface 118 on the user computer display 104. Referring to FIG. 2B for illustration, the filtering interface 118 may be configured to enable the user to set a geospatial perimeter 156 such that the data subset weights will only be based on data entries in the weight field that relate to geolocations within the set geospatial perimeter.

In embodiments of the non-transitory computer-readable medium in which the data entries of at least one of the data fields are geolocations, the steps performed by the one or more processors may further comprise presenting a secondary visualization interface 112 on the user computer display. As illustrated in FIG. 1, the secondary visualization interface 112 may include, for example, an interactive graphic representation of a globe on which the user can select or draw a closed contour shape. The geospatial perimeter may be therefore set by the selected or drawn closed contour shape.

In particular embodiments of the non-transitory computer-readable medium the data entries of at least one of the data fields may be components of a product 162. With reference to block 216, in such embodiments, the steps performed may further comprise providing a filtering interface 118 on the user computer display 104. The filtering interface may be configured to enable the user to select a subsystem encompassing a subset of the components 160 such that the data subset weights will only be based on data entries in the weight field that relate to the components 160 within the selected subsystem 158. With reference to block 218, in such embodiments, the steps may further comprise presenting a tertiary visualization interface 114 on the user computer display 104. The tertiary visualization interface may include an interactive graphic representation of the product 162 by which the user can select a subsystem 158. The product 162 could be any manufactured object, whether simple or complex, including a consumer device, a power tool, a spacecraft, an aircraft, a watercraft, an automobile, or the like.

With reference again to FIGS. 7A and 7B, a method of visualizing one or more datasets may comprise one or more steps. Referring to block 202, one or more datasets 100 may be retrieved from a database. Referring to FIG. 6 for illustration, the one or more datasets may include a plurality of data fields (e.g., columns 102*a*-102*f*). Each data field may have respective data entries therein (e.g., the data entered within the cells under the respective fields). The data entries of one of the data fields may have a date, time or date-time format. See, for example, the last data field 102*f*.

Referring to block 204, a grouping interface 116 may be provided for display on a user computing device 104, wherein the grouping interface enables a user to select a first said data field to define a grouping field. Referring to block 206, an options interface or the equivalent may be provided for display on the user computing device, wherein the options interface enables the user to select a second said data field to define a weight field.

Referring to block 208, a data subset weight corresponding to each of the grouping field data entries may be calculated. Each data subset weight may preferably be based on either: (a) the number of data entries in the weight field that relate to the respective grouping field data entry, or (b) the value sum of the data entries in the weight field that relate to the respective grouping field data entry. The latter might apply, for example, when the weight field contains data entries in dollar amounts that can be summed, such as the contractual obligation data field shown in FIG. 6.

Referring to block 210, a primary visualization interface may be provided for display on a user computer device. The primary visualization interface may include a packed collection of spheres. Each of the spheres may preferably represent a respective grouping field data entry. The spheres may have relative sizes with respect to one another based upon their respective data subset weights. The primary visualization interface may also include a time histogram element. The time histogram element may include, for example, a time slider (or the equivalent) adjustable by the user to select a data time period, wherein said adjustment causes a revision (e.g., updating) of the packed collection based on the selected data time period. The time histogram element may at least partially circumferentially envelope the packed collection of spheres.

In particular embodiments of a method of visualizing one or more datasets, the grouping interface may be configured to enable the user to select additional data fields to define respective additional grouping fields. In such embodiments, the grouping fields may preferably be organized hierarchically from highest to lowest. In such embodiments, the user may be enabled to select (e.g., by mouse movement or click) a said sphere, thereby causing the collection of spheres to update such that the updated spheres represent data elements in the next lowest grouping field that relate to the data entry of the selected sphere.

The data entries of at least one of the data fields may be geolocations. With reference to block 212, in such cases, the method may further comprise providing a filtering interface for display on the user computer device. The filtering interface may be configured to enable the user to set a geospatial perimeter such that the data subset weights will only be based on data entries in the weight field that relate to geolocations within the set geospatial perimeter. Moreover, referring to block 214, a secondary visualization interface may be presented for display on the user computer device. The secondary visualization interface 112 may include an interactive graphic representation of a globe on which the user can select or draw a closed contour shape (e.g., a rectangle, circle, etc.). The geospatial perimeter 156 may therefore be set by the selected or drawn closed contour shape.

The data entries of at least one of the data fields may be components of a product (e.g., a jet engine, structural component or instrument of a particular aircraft). With reference to block 216, in such cases, the method may further comprise providing a filtering interface for display on the user computer device. The filtering interface 118 may be configured to enable the user to select a subsystem encompassing a subset of the components such that the data subset weights will only be based on data entries in the weight field that relate to the components within the selected subsystem. Referring to block 218, a tertiary visualization interface may be presented for display on the user computer device. The tertiary visualization interface may include, for example an interactive graphic representation (e.g., an engineering drawing or other technical view) of the product by which the user can select a said subsystem.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A non-transitory computer readable medium storing computer-readable instructions for producing the visualization of data on a user computer display, wherein execution of the computer-readable instructions is configured to cause one or more computer processors to perform steps comprising:

retrieving a dataset from a database, the dataset including a plurality of data fields, each data field having respective data entries therein, the data entries of one of said data fields having a date, time or date-time format;

enabling a user to select a first said data field to define a grouping field;

enabling the user to select a second said data field to define a weight field;

calculating a data subset weight corresponding to each of the grouping field data entries, each data subset weight being based on either:
  (a) the number of data entries in the weight field that relate to the respective grouping field data entry, or
  (b) the value sum of the data entries in the weight field that relate to the respective grouping field data entry; and presenting a primary visualization interface on a user computer display, the primary visualization interface including
  (a) a packed collection of spheres, each of the spheres representing a respective grouping field data entry, the spheres having relative sizes with respect to one another based upon their respective data subset weights, and
  (b) a time histogram element including a time slider adjustable by the user to select a data time period, wherein said adjustment causes a revision of the packed collection based on the selected data time period.

2. The non-transitory computer-readable medium as defined in claim 1 wherein the time histogram element at least partially circumferentially envelopes the packed collection of spheres.

3. The non-transitory computer-readable medium as defined in claim 1 wherein the steps further comprise:
providing a grouping interface configured to enable the user to select additional said data fields to define respective additional grouping fields, wherein the grouping fields are organized hierarchically from highest to lowest; and
enabling the user to select a said sphere, thereby causing the collection of spheres to update such that the updated spheres represent data elements in the next lowest grouping field that relate to the data entry of the selected sphere.

4. The non-transitory computer-readable medium as defined in claim 1 wherein:
  (a) the data entries of at least one of the data fields are geolocations; and
  (b) the steps further comprise providing a filtering interface on the user computer display, the filtering interface being configured to enable the user to set a geospatial perimeter such that the data subset weights will only be based on data entries in the weight field that relate to geolocations within the set geospatial perimeter.

5. The non-transitory computer-readable medium as defined in claim 4 wherein the steps further comprise:
presenting a secondary visualization interface on the user computer display, the secondary visualization interface including an interactive graphic representation of a globe on which the user can select or draw a closed contour shape, the geospatial perimeter being set by the selected or drawn closed contour shape.

6. The non-transitory computer-readable medium as defined in claim 1 wherein:
  (a) the data entries of at least one of the data fields are components of a product; and (b) the steps further comprise providing a filtering interface on the user computer display, the filtering interface being configured to enable the user to select a subsystem encompassing a subset of said components such that the data subset weights will only be based on data entries in the weight field that relate to the components within the selected subsystem.

7. The non-transitory computer-readable medium as defined in claim 6 wherein the steps further comprise:
presenting a tertiary visualization interface on the user computer display, the tertiary visualization interface including an interactive graphic representation of the product by which the user can select a said subsystem.

8. The non-transitory computer-readable medium as defined in claim 6 wherein the product is a spacecraft, an aircraft, a watercraft or an automobile.

9. A method of visualizing one or more datasets, the method comprising:
retrieving one or more datasets from a database, the one or more datasets including a plurality of data fields, each data field having respective data entries therein, the data entries of one of said data fields having a date, time or date-time format;
providing a grouping interface for display on a user computing device, wherein the grouping interface enables a user to select a first said data field to define a grouping field;
providing an options interface for display on the user computing device, wherein the options interface enables the user to select a second said data field to define a weight field;
calculating a data subset weight corresponding to each of the grouping field data entries, each data subset weight being based on either:
 (a) the number of data entries in the weight field that relate to the respective grouping field data entry, or
 (b) the value sum of the data entries in the weight field that relate to the respective grouping field data entry; and
providing a primary visualization interface for display on a user computer device, the primary visualization interface including
 (a) a packed collection of spheres, each of the spheres representing a respective grouping field data entry, the spheres having relative sizes with respect to one another based upon their respective data subset weights, and
 (b) a time histogram element, the time histogram element including a time slider adjustable by the user to select a data time period, wherein said adjustment causes a revision of the packed collection based on the selected data time period.

10. The method as defined in claim 9 wherein the time histogram element at least partially circumferentially envelopes the packed collection of spheres.

11. The method as defined in claim 9 wherein
the grouping interface is configured to enable the user to select additional said data fields to define respective additional grouping fields, wherein the grouping fields are organized hierarchically from highest to lowest; and
the user is able to select a said sphere, thereby causing the collection of spheres to update such that the updated spheres represent data elements in the next lowest grouping field that relate to the data entry of the selected sphere.

12. The method as defined in claim 9 wherein:
(a) the data entries of at least one of the data fields are geolocations; and
(b) the method further comprises providing a filtering interface for display on the user computer device, the filtering interface being configured to enable the user to set a geospatial perimeter such that the data subset weights will only be based on data entries in the weight field that relate to geolocations within the set geospatial perimeter.

13. The non-transitory computer-readable medium as defined in claim 12 further comprising:
presenting a secondary visualization interface for display on the user computer device, wherein the secondary visualization interface includes an interactive graphic representation of a globe on which the user can select or draw a closed contour shape, the geospatial perimeter being set by the selected or drawn closed contour shape.

14. The method as defined in claim 9 wherein:
(a) the data entries of at least one of the data fields are components of a product; and
(b) the method further comprises providing a filtering interface for display on the user computer device, the filtering interface being configured to enable the user to select a subsystem encompassing a subset of said components such that the data subset weights will only be based on data entries in the weight field that relate to the components within the selected subsystem.

15. The method as defined in claim 14 further comprising:
presenting a tertiary visualization interface for display on the user computer device, wherein the tertiary visualization interface includes an interactive graphic representation of the product by which the user can select a said subsystem.

16. The method as defined in claim 14 wherein the product is a spacecraft, an aircraft, a watercraft or an automobile.

* * * * *